(12) United States Patent
Draney et al.

(10) Patent No.: US 6,216,797 B1
(45) Date of Patent: Apr. 17, 2001

(54) THRUST SYSTEM FOR A HORIZONTAL DIRECTIONAL DRILL

(75) Inventors: Robert G. Draney; Willie Lessard, both of Forest Lake, MN (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/228,154

(22) Filed: Jan. 11, 1999

(51) Int. Cl.⁷ .................................................. B23Q 5/00
(52) U.S. Cl. ......................... 173/147; 173/141; 173/195
(58) Field of Search ................................. 173/147, 195, 173/196; 175/31, 141, 122, 162; 92/137

(56) References Cited

U.S. PATENT DOCUMENTS

| | | | |
|---|---|---|---|
| 2,029,223 | * 1/1936 | Curtis | 92/137 |
| 2,726,065 | * 12/1955 | Feucht | 173/147 |
| 3,679,194 | 7/1972 | Boettcher | 74/89.2 |
| 3,850,043 | 11/1974 | Tarbox | 74/89.2 |
| 3,888,272 | 6/1975 | Larsson | 74/27 |
| 4,207,805 | * 6/1980 | Jonsson | 173/147 |
| 4,303,132 | * 12/1981 | Weber | 173/147 |
| 4,434,860 | * 3/1984 | Deyo | 173/147 |
| 4,456,077 | * 6/1984 | Lagerstedt et al. | 173/147 |
| 4,630,431 | 12/1986 | Schlueter et al. | 74/608 |
| 4,865,516 | 9/1989 | Focke et al. | 414/792.8 |
| 5,226,488 | * 7/1993 | Lessard et al. | 173/147 |
| 5,231,899 | 8/1993 | Lee | 81/57.16 |
| 5,253,721 | 10/1993 | Lee | 175/73 |
| 5,343,962 | * 9/1994 | Daigle et al. | 173/147 |
| 5,355,965 | * 10/1994 | Rozendaal | 173/147 |
| 5,709,276 | 1/1998 | Lee | 175/122 |

FOREIGN PATENT DOCUMENTS

| | | | |
|---|---|---|---|
| 61371 | * 10/1942 | (DK) | 173/147 |
| 421758 | * 8/1974 | (SU) | 173/147 |

* cited by examiner

*Primary Examiner*—Peter Vo
*Assistant Examiner*—Jim Calve
(74) *Attorney, Agent, or Firm*—Jansson, Shupe & Munger, Ltd.

(57) ABSTRACT

A thrust system for a horizontal directional drill is provided. The thrust system includes a drill boom having a drive sprocket positioned at the first end thereof and a driven sprocket positioned at the second end thereof. A carriage for supporting the horizontal drill is slidably received on the drill boom. The carriage includes idler sprockets positioned between the drive sprocket and driven sprocket in the drill boom. A serpentine chain extends about the drive sprocket, the driven sprocket and the idler sprockets in order to provide greater thrust and pullback of the drill at given torques. Rotation of the drive sprocket in a first direction draws the carriage towards the first end of the drill boom, and rotation of the drive sprocket in a second direction draws the carriage towards the second end of the drill boom.

16 Claims, 7 Drawing Sheets

THRUST SYSTEM FOR A HORIZONTAL DIRECTIONAL DRILL

BACKGROUND AND SUMMARY OF THE INVENTION

This invention relates to boring machines, and in particular, to an improved thrust system for a horizontal directional drill.

Horizontal directional drills are portable drilling rigs or boring machines which are smaller and lighter in comparison to their vertical counterparts. These types of drills are particularly suited for the installation of small diameter, underground utility service. Previously, the installation of such utility service was accomplished by trench digging equipment or the like. The use of trench digging equipment to install such service is time consuming, inefficient and expensive. As such, alternate devices, such as horizontal directional drills, which are simple and inexpensive to operate are highly desirable.

While prior horizontal directional drills are adequate for certain applications, such types of drills have been limited by the amount of thrust and pullback of the drill at given torques. Consequently, it is highly desirable to provide a horizontal directional drill with more thrust and pullback of the drill at given torques to overcome the deficiencies in the prior.

Therefore, the primary object and feature of the present invention to provide a horizontal directional drill having a thrust system which generates greater thrust and pullback at a given torque.

It is a still further object and feature of the present invention to provide a horizontal directional drill having a thrust system which is simple to construct.

It is a still further object and feature of the present invention to provide a horizontal directional drill which is portable and may be repositioned easily.

In accordance with the present invention, a horizontal directional drill having an improved thrust system is provided. The thrust system includes a drill boom extending along a longitudinal axis and terminating at first and second opposite ends. A drive sprocket is positioned at the first end of the drill boom and a driven sprocket is positioned at the second, opposite end of the drill boom. A carriage is supported by the drill boom for movement therealong. The carriage has a first and second idler sprockets positioned between the drive sprocket and the driven sprocket in the drill boom. A chain is also positioned within the drill boom and has first and second ends fixed therein. The chain extends about the drive sprocket, the driven sprocket and the idler sprockets such that rotation of the drive sprocket in a first direction drives the carriage toward a first end of the boom, and rotation of the driven sprocket in a second direction draws the carriage toward a second end of the drill boom.

The thrust system further includes a drive mechanism for rotating the drive sprocket in the first and second directions. It is contemplated that the drive mechanism include a hydraulic motor.

The drill boom includes one or more guide tracks extending along the longitudinal length thereof. The carriage includes a corresponding number of guiding members which engage corresponding guide tracks and guide the longitudinal movement of the carriage. The chain successively engage the first idler sprocket, the drive sprocket, the driven sprocket and the second idler sprocket. The first end of the chain is affixed adjacent to the drive sprocket and the second end of the chain is affixed adjacent the driven sprocket. A chain tension adjustment mechanism is interconnected to the driven sprocket for adjusting the tension on the chain.

In accordance with a still further aspect of the present invention, a thrust system for a horizontal directional drill is provided. The thrust system includes a drill boom extending along a longitudinal axis and terminating at first and second opposite ends. The drill boom includes a rotatable drive sprocket positioned at the first end of the drill boom and a rotatable driven sprocket positioned at the second end of the drill boom. A carriage supports the drill and is movable along the drill boom. The carriage includes first and second idler sprockets positioned between the drive sprocket and the driven sprocket in the drill boom. Guide structure guides the movement of the carriage along the drill boom. A chain having first and second ends affixed within the drill boom extends about the drive sprocket, the driven sprocket, and the idler sprocket, such that rotation of the drive sprocket in a first direction draws the carriage towards the first end of the drill boom and rotation of the drive sprocket in a second direction draws the carriage toward the second end of the drill boom. A drive mechanism is provided for rotating a drive sprocket in a predetermined direction.

The guide structure includes first and second guide tracks extending along the length of the drill boom, and first and second guiding members extending from the carriage. Each guiding member engages a corresponding guide track.

In accordance with a still further aspect of the present invention, a thrust system for a horizontal directional drill is provided. The thrust system includes a drill boom extending along a longitudinal axis and terminating at first and second opposite ends. The drill boom includes a rotatable drive sprocket positioned at the first end of the drill boom and a rotatable driven sprocket positioned at the second end of the drill boom. First and second guide tracks extend along the length of of the drill boom. A carriage is provided for supporting the drill. The carriage is movable along the drill boom and has first and second idler sprockets positioned between the drive sprocket and the driven sprocket between the drill boom. First and second guiding members extend from the carriage. Each guiding member engages a corresponding guide track for guiding movement of the carriage along the drill boom.

A chain having first and second ends fixed within the drill boom is provided. The chain extends about the drive sprocket, the driven sprocket and the idler sprockets, such that rotation of the drive sprocket in a first direction draws the carriage toward the first end of the drill boom, and rotation of the drive sprocket in a second direction draws the carriage towards the second end of the drill boom. A drive mechanism is provided for rotating the drive sprocket in a predetermined direction.

A chain tension adjustment mechanism may be interconnected to the driven sprocket for adjusting the tension of the chain.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the Drawings

DETAILED DESCRIPTION OF THE ILLUSTRATED ENVIRONMENT

Figure 1:
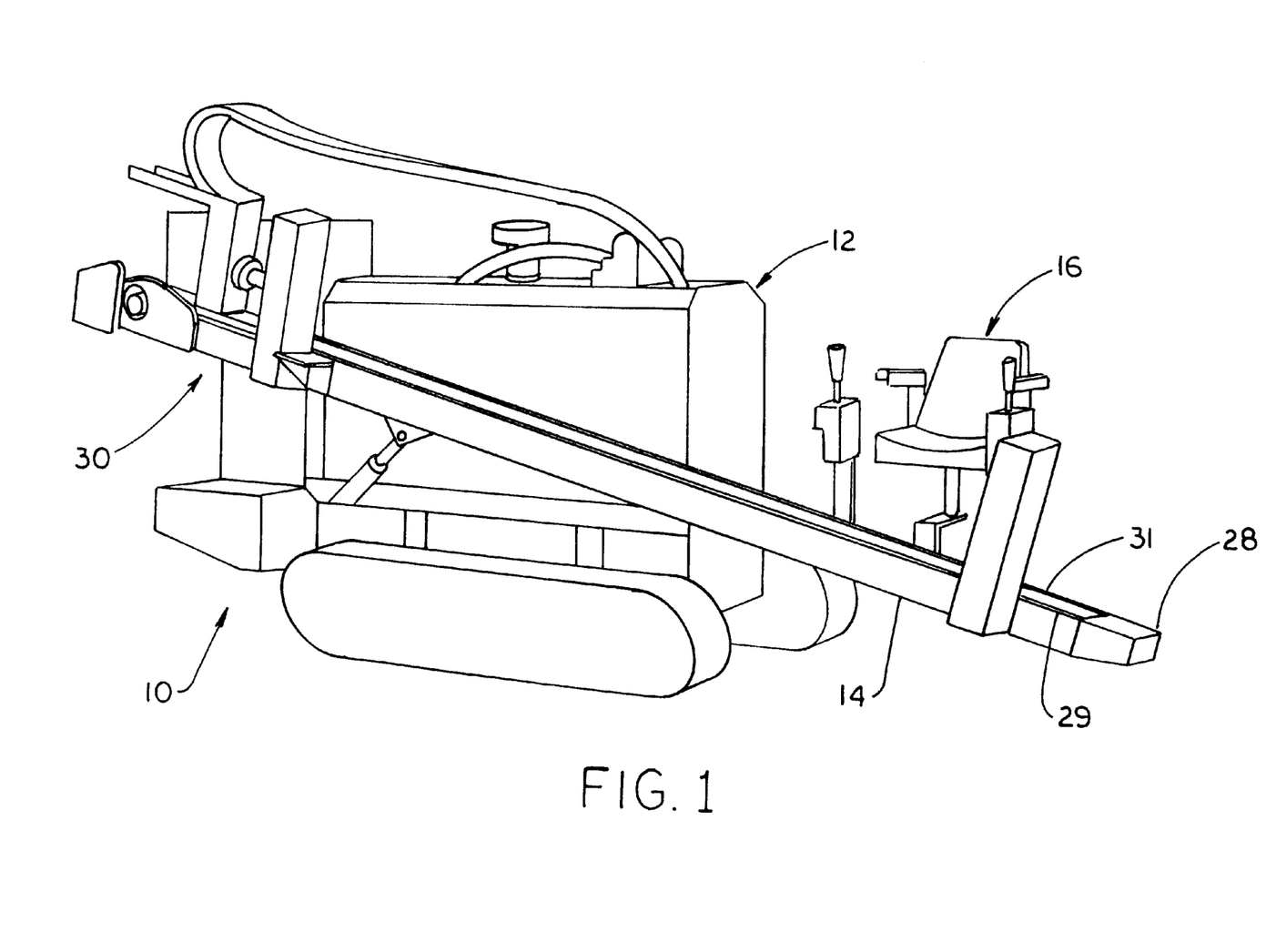
FIG. 1 is an isometric view of a horizontal directional drilling machine incorporating a thrust system in accordance with the present invention.

Referring to FIG. 1, a horizontal directional drilling machine is designated by the reference numeral 10. Horizontal directional drilling machine 10 includes a tractor 12 supporting a drill boom 14. A control structure 16 is provided to control the position and operation of the thrust system of the present invention housed in drill boom 14.

Figure 2:
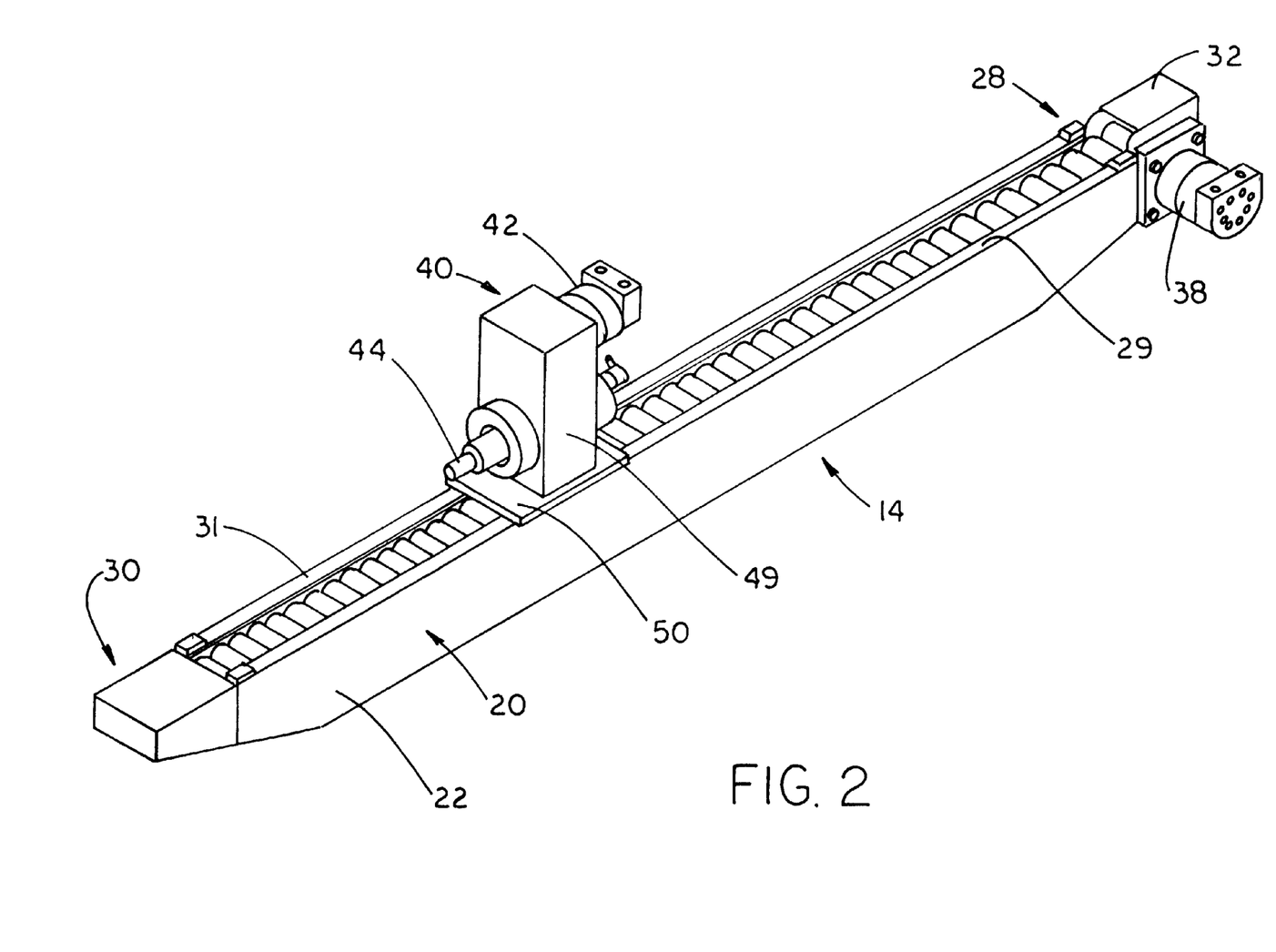
FIG. 2 is an isometric view of the thrust system of the present invention.
Figure 3:
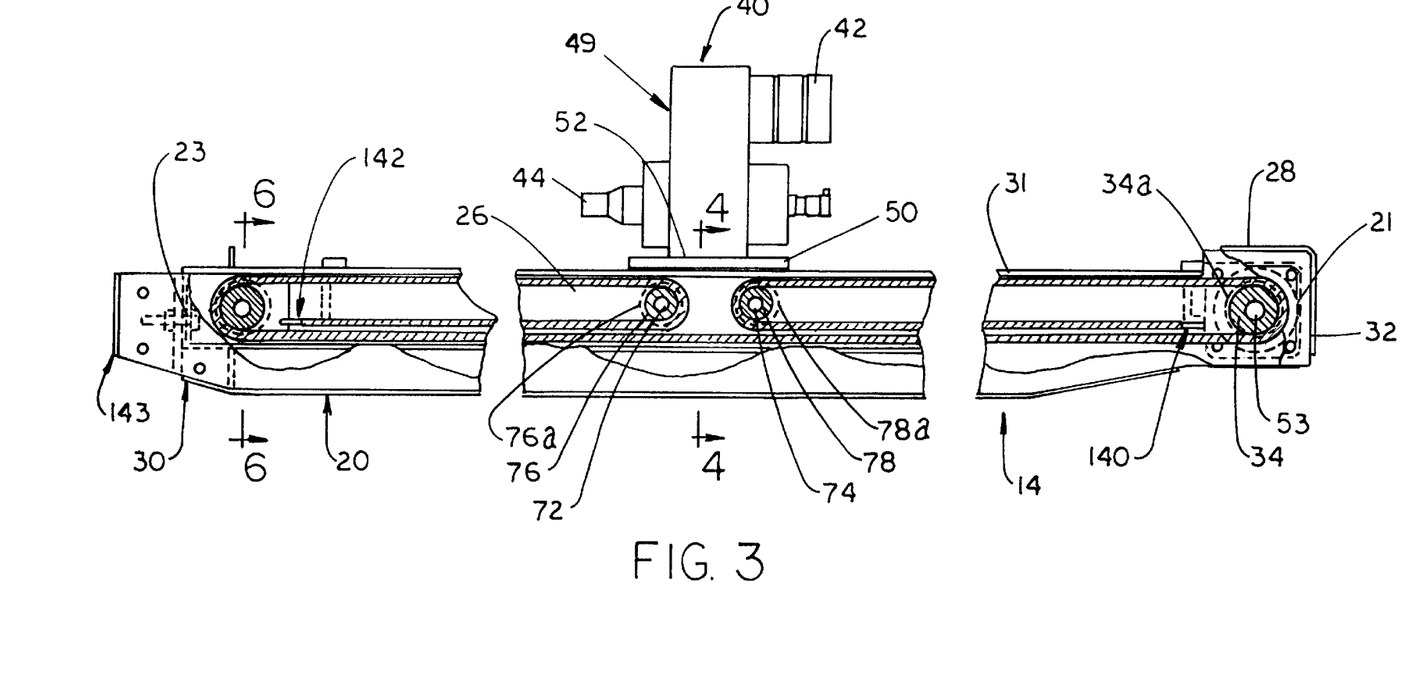
FIG. 3 is a cross sectional view of the thrust system of FIG. 2.
Figure 4:
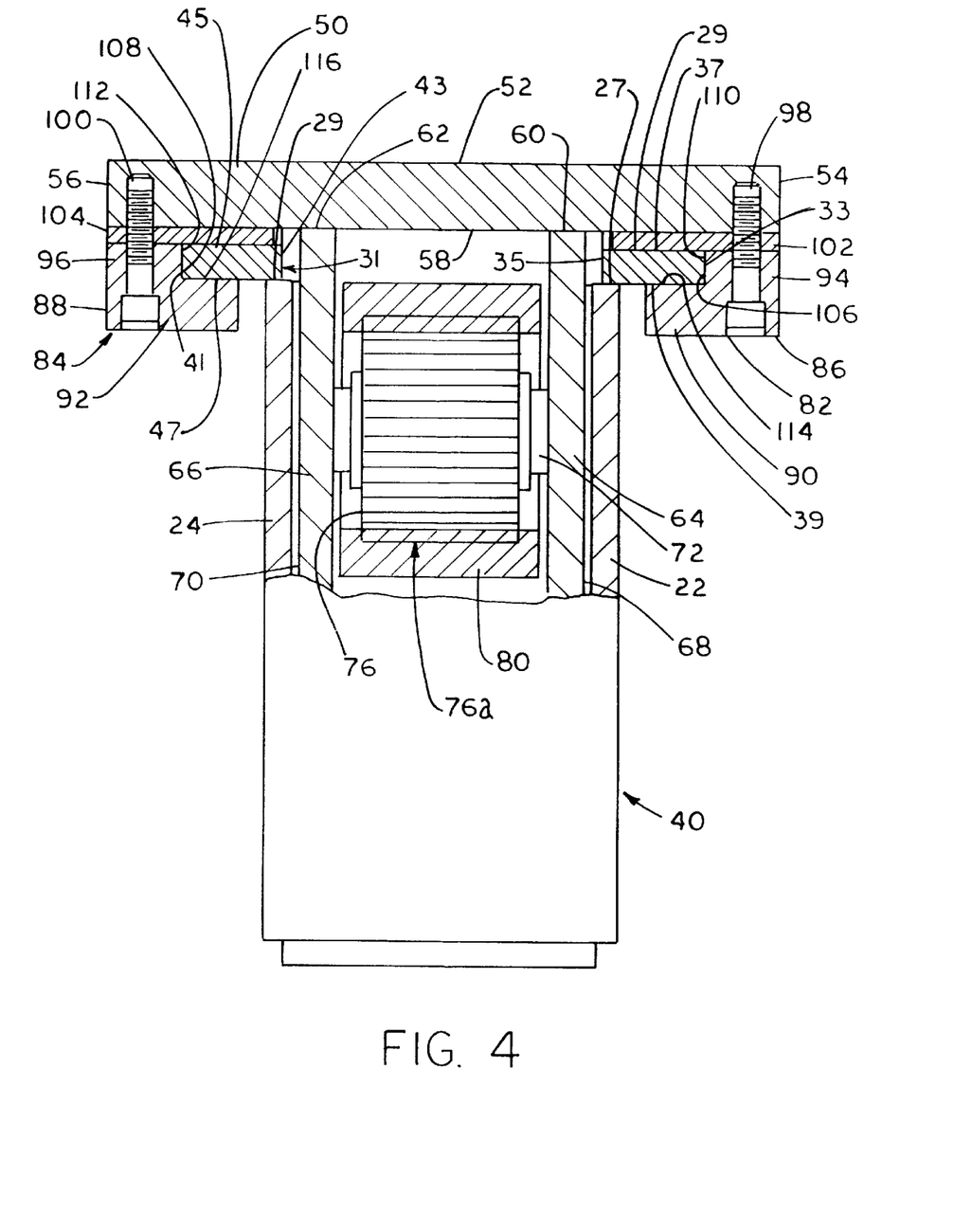
FIG. 4 is a cross sectional view of the thrust system of the present invention taken along line 4—4 of FIG. 3.

As best seen in FIGS. 2–4, drill boom 14 extends along a longitudinal axis and includes a support frame 20. Support frame 20 includes first and second spaced side walls 22 and 24, respectively, interconnected by first and second end walls 21 and 23, respectively, so as to define a thrust system receipt cavity 26. Upper edges 25 and 27 of side walls 22 and 24, respectively, include first and second guide tracks 29 and 31, respectively, extending laterally therefrom. Guide track 29 is generally rectangular in cross section and is defined by first and second sides 33 and 35, respectively, interconnected by upper and lower guiding surfaces 37 and 39, respectively. Similarly, guide track 31 is generally rectangular in cross section and is defined by first and second sides 41 and 43, respectively, interconnected by upper and lower guiding surfaces 45 and 47, respectively.

Support frame 20 terminates at first and second opposite ends 28 and 30, respectively, which enclose corresponding sprockets therein, as hereinafter described. First end 28 of support frame 20 includes an enclosure 32 having a rotatable drive sprocket shaft 53 extending therethrough along an axis transverse to the longitudinal axis of the drill boom 14. A drive sprocket 34 is mounted on the drive sprocket shaft 53 such that drive sprocket shaft 53 and drive sprocket 34 rotate in unison. It is contemplated that drive sprocket shaft 53 be rotated by a conventional, bi-directional hydraulic motor 38.

As best seen in FIGS. 2–3, a movable carriage 40 is slidably mounted on support frame 20. Carriage 40 includes an upper portion 49 having a rotary motor 42 for rotating arbor 44. Arbor 44 is adapted for receiving a drilling tool (not shown) such as drill pipe or auger thereon.

Referring to FIGS. 3–4, carriage 40 further includes a generally flat, horizontal base 50 having an upper surface 52 on which upper portion 49 of carriage 50 is supported. Horizontal base 50 of carriage 40 is further defined by first and second sides 54 and 56, respectively, interconnected by a lower surface 58. Lower surface 58 of horizontal base 50 is interconnected to upper edges 60 and 62 of corresponding idler sprocket support walls 64 and 66, respectively, which depend therefrom.

Figure 5:
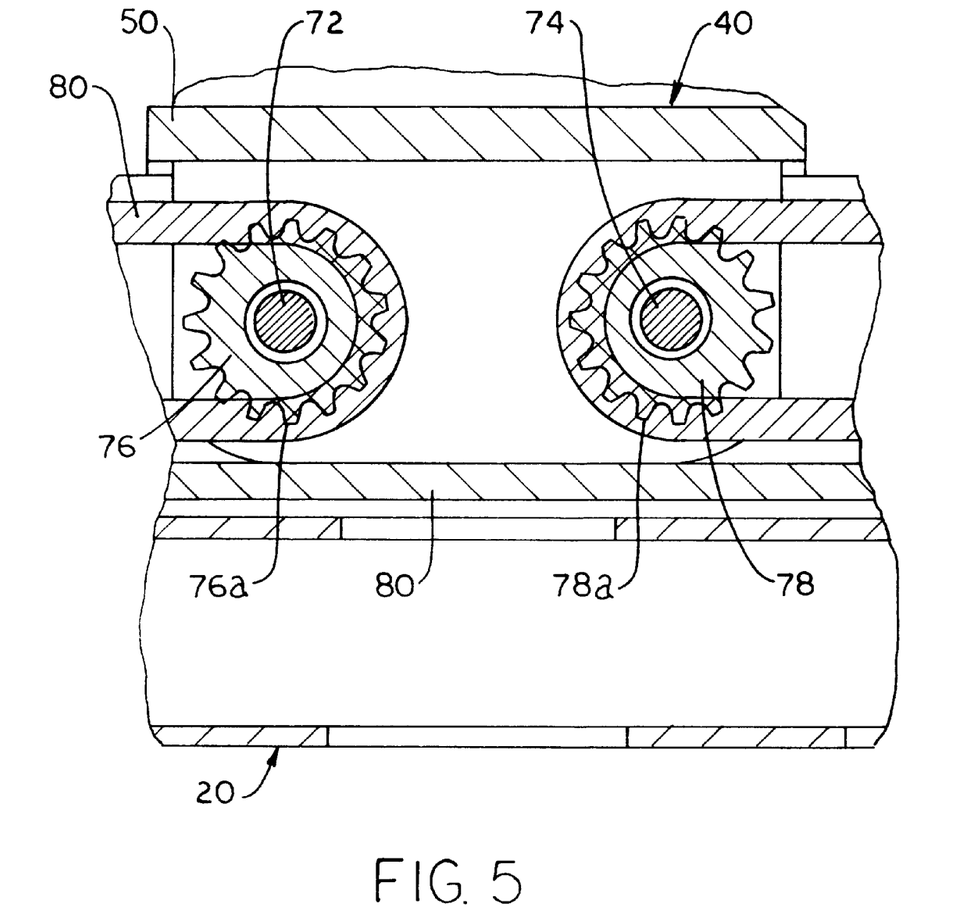
FIG. 5 is an enlarged, cross sectional view of the thrust system of the present invention showing the idler sprockets for the carriage thereof.

Idler sprocket support walls 64 and 66 extend into thrust system support cavity 26 in drill boom 14 such that the outer face 68 of idler sprocket support wall 64 is directed towards side wall 22 of drill boom 14 and such that the outer face 70 of idler sprocket support wall 66 is directed towards side wall 24 of drill boom 14. As best seen in FIG. 5, first and second idler sprocket support shafts 72 and 74, respectively, extend between idler sprocket support walls 64 and 66. Idler sprockets 76 and 78 are rotatably supported on corresponding idler sprocket support shafts 72 and 74, respectively. Each idler sprocket 76 and 78 includes a plurality of teeth 76a and 78a, respectively, extending from the outer surface thereof for engaging and forming a mating relationship with drive chain 80.

Referring to FIG. 4, carriage 40 further includes first and second guiding members 82 and 84, respectively, mounted to lower surface 58 of horizontal base 50 for guiding the slidable movement of carriage 40 along drill boom 14. Guide members 82 and 84 include generally L-shaped guides 86 and 88, respectively, mounted the lower surface 58 of horizontal base 50. Guides 86 and 88 include first horizontal legs 90 and 92, respectively, directed towards each other and towards drill boom 14. Second legs 94 and 96 of guides 86 and 88, respectively, extend towards and are interconnected to lower surface 58 of horizontal base 50 by corresponding bolts 98 and 100, respectively.

Low-friction members 102 and 104 are captured between corresponding guides 86 and 88, respectively, and the lower surface 58 of horizontal base 50 such that low-friction member 102 and guide 86 define a first guide track receiving cavity 106 and such that low-friction member 104 and guide 88 define a second guide track receiving cavity 108.

Guide track receiving cavities 106 and 108 are adapted for receiving corresponding guide tracks 29 and 31, respectively, therein. As best seen in FIG. 4, low-friction members 102 and 104 of carriage 40 slidably engage corresponding upper guiding surfaces 37 and 45, respectively, of guide tracks 29 and 31, respectively, in order to facilitate the smooth and unhindered movement of carriage 40 along drill boom 14.

Inner surfaces 110 and 112 of second legs 94 and 98, respectively, of guides 86 and 88, respectively, slidably engage corresponding sides 33 and 41 of guide tracks 29 and 31, respectively, in order to prevent lateral movement of carriage 40. Similarly, upper surfaces 114 and 116 of first legs 90 and 92, respectively, of guides 86 and 88, respectively, slidably engage corresponding lower guiding surfaces 39 and 47 of guide tracks 29 and 31, respectively, and maintain carriage 40 on drill boom 14.

Figure 6:
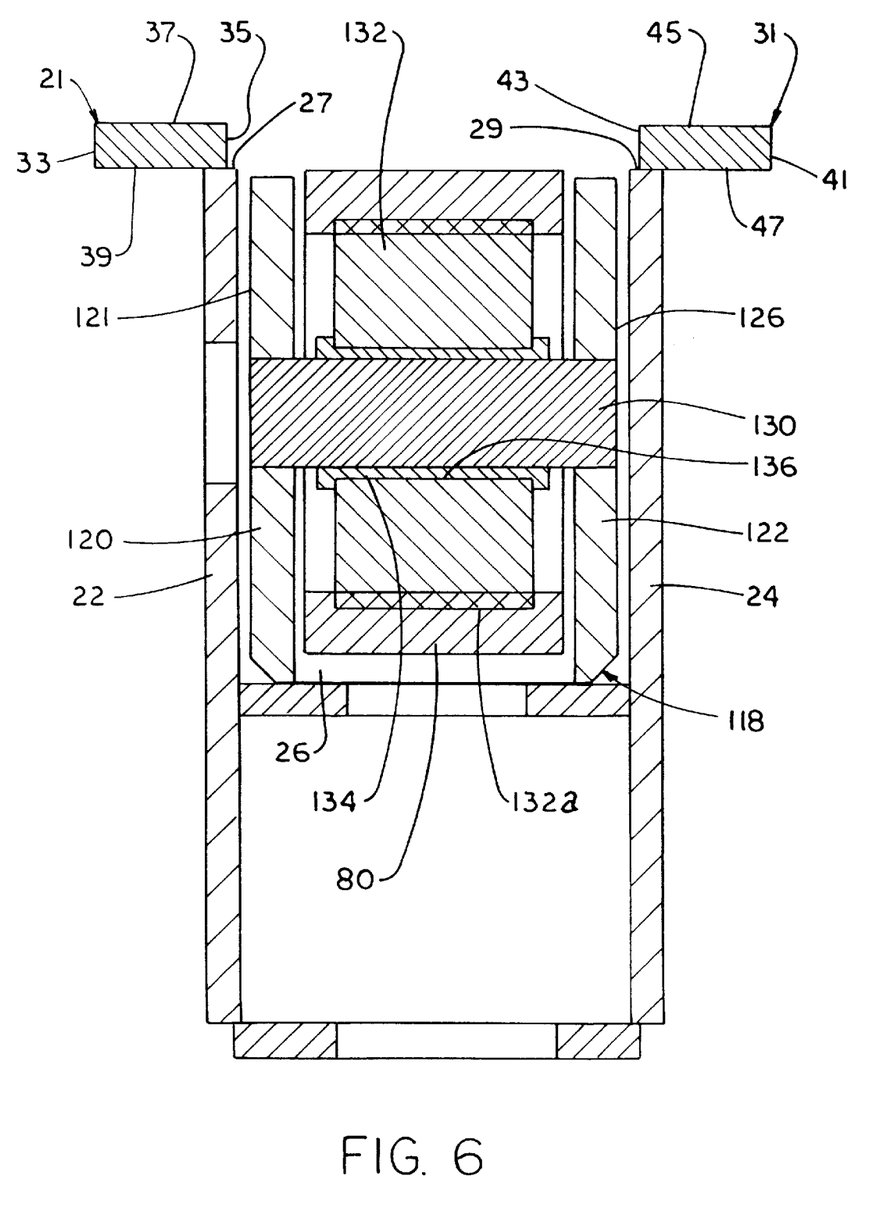
FIG. 6 is a cross sectional view of the thrust system of the present invention taken along line 6—6 of FIG. 3.
Figure 7:
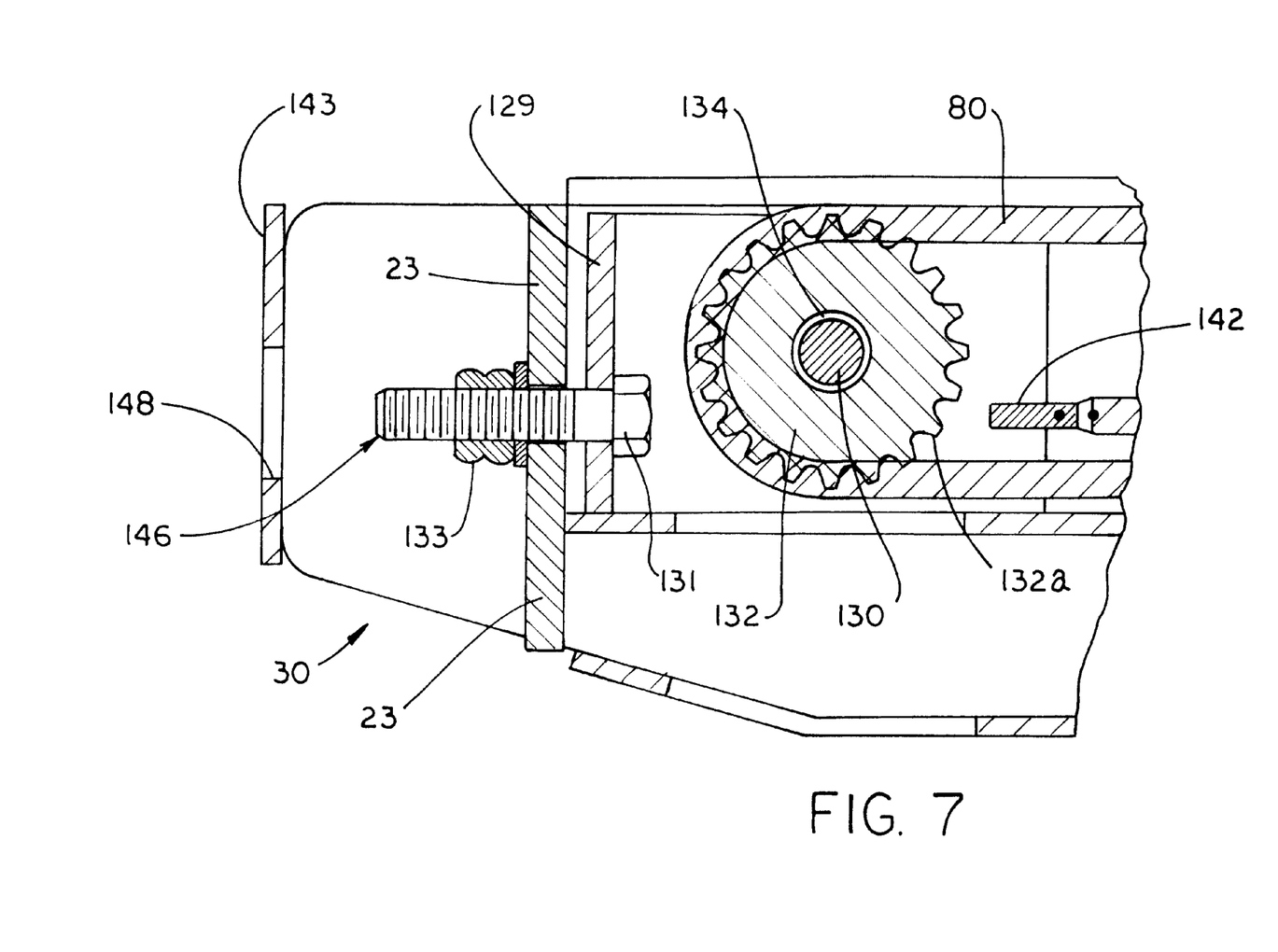
FIG. 7 is an enlarged, cross sectional view of the thrust system of the present invention showing the driven sprocket and chain tensioning structure thereof.

Referring to FIGS. 6 and 7, a driven sprocket receipt housing 118 is slidably supported within thrust system support cavity 26 at the second end 30 of support frame 20. Driven sprocket receipt housing 118 is defined by spaced driven sprocket support walls 120 and 122 which extend along the longitudinal axis of drill boom 14 such that the outer face 124 of drive sprocket support wall 120 is directed towards side wall 22 of drill boom 14 and such that the outer face 126 of driven sprocket support wall 122 is directed towards side wall 24 of drill boom 14. Driven sprocket support walls 120 and 122 are interconnected by end wall 129 which is transverse to the longitudinal axis of drill boom 14. A threaded bolt 131 extends through end wall 129 of driven sprocket receipt housing 118 and end wall 23 of support frame 20. Nut 133 is threaded onto threaded bolt 131 such that rotation of the nut 133 varies the position of driven sprocket receipt housing 118 along the longitudinal axis of drill boom 14.

Driven sprocket support shaft 130 extends between driven sprocket support walls 120 and 122. Driven sprocket 132 is rotatably supported on driven sprocket support shaft 130. A bearing 134 is positioned between the inner radial surface 136 of driven sprocket 132 and driven sprocket support shaft 130 to facilitate rotation of driven sprocket 132. Driven sprocket 132 includes a plurality of teeth 132a projecting from the outer surface thereof for engaging and forming a mating relationship with drive chain 80.

Drive chain 80 includes a first end 140 fixed within the thrust system support cavity 26 in support frame 20 adjacent the first end 28 thereof. Driven chain extends about the teeth 78a of second idler sprocket 78 and, thereafter, about the teeth 34a of drive sprocket 34. Drive chain 80 continues about teeth 132a of driven sprocket 132 and, thereafter, about the teeth 76a of first idler sprocket 76. The second end 142 of drive chain 80 is fixed within the thrust system support cavity 26 in support frame 20 adjacent the second end 30 thereof.

In operation, hydraulic motor 38 rotates drive sprocket shaft 53 in a user desired direction which, in turn, rotates drive sprocket 34. By rotating drive sprocket 34 in a clockwise direction, FIG. 2, the length of drive chain 80 between first end 140 thereof and drive sprocket 34 is reduced thereby drawing carriage 40 toward the first end 28 of support frame 20, i.e. carriage 40 slides from left to right in FIG. 2. As carriage 40 slides toward the first end 28 of support frame 20, first idler sprocket 76 takes up the slack in drive chain 80.

By rotating drive sprocket 34 in a counter-clockwise direction, FIG. 2, drive chain 80 is drawn counterclockwise about the teeth 132a of driven sprocket 132 so as to reduce the length of drive chain 80 between second end 142 thereof and driven sprocket 132 thereby drawing carriage 40 toward the second end 30 of support frame 20, i.e. carriage 40 slides from right to left in FIG. 2. As carriage 40 slides toward the second end 30 of support frame 20, second idler sprocket 78 takes up the slack in drive chain 80.

It is contemplated to thread nut 133 onto or off of threaded bolt 131 in order to vary the position of driven sprocket receipt housing 118, and hence driven sprocket 132, along the longitudinal axis of drill boom 14 so as to maintain proper tension on drive chain 80. It is further contemplated to mount an enclosure 143 on the second end 30 of support frame 20 in order to enclose end 146 of threaded bolt 131. An opening 148 may be provided in enclosure 143 to allow user access to nut 133 in to for the user to adjust the tension on chain 80.

The movement of carriage 40 along drill boom 14 corresponds to the thrust and pullback of a drill mounted on the arbor 44 of carriage 40. The serpentine arrangement of drive chain 80 about drive sprocket 34, driven sprocket 132, and idler sprockets 76 and 78 provides the desired thrust and pullback to the drill mounted on arbor 44 of carriage 40.

Various other modes of carrying out the invention are contemplated as being within the scope of the following claims particularly pointing out and distinctly claiming the subject matter regarded as the invention.

We claim:

1. A thrust system for a horizontal directional drill, comprising:
    a drill boom extending along a longitudinal axis and terminating at first and second opposite ends, the drill boom including a drive sprocket positioned at the first end of the drill boom and a driven sprocket positioned at the second end of the drill boom;
    a drill carriage supported by the drill boom for movement therealong, the carriage having first and second idler sprockets positioned between the drive sprocket and the driven sprocket in the drill boom; and
    a single chain having a first end independent of the carriage and fixed within the drill boom adjacent the first end of the drill boom for preventing movement thereof and a second end independent of the carriage and fixed within the drill boom adjacent the second end of the drill boom for preventing movement thereof, the chain extending sequentially from said first end of said single chain about the first idler sprocket, the drive sprocket, the driven sprocket and the second idler sprocket to said second end of said single chain such that rotation of the drive sprocket in a first direction draws the carriage towards the first end of the drill boom, and
    rotation of the drive sprocket in a second direction draws the carriage towards the second end of the drill boom.

2. The thrust system of claim 1 further comprising a drive mechanism for rotating the drive sprocket in the first and second directions.

3. The thrust system of claim 2 wherein the drive mechanism includes a hydraulic motor.

4. The thrust system of claim 1 wherein the drill boom includes a guide track therein extending along the longitudinal length thereof.

5. The thrust system of claim 4 wherein the carriage includes a guiding member, the guiding member engaging the guide track and guiding the longitudinal movement of the carriage.

6. The thrust system of claim 4 wherein the drill boom includes a second guide track parallel to and spaced from the first guide track.

7. The thrust system of claim 6 wherein the carriage includes first and second guiding members, each first guiding member engaging the first guide track and each second guiding member engaging the second guide track so as to guide the longitudinal movement of the carriage.

8. The thrust system of claim 1 further comprising a chain-tension adjustment mechanism interconnected to the driven sprocket for adjusting the tension on the chain.

9. A thrust system for a horizontal directional drill, comprising:
    a drill boom extending along a longitudinal axis and terminating at first and second opposite ends, the drill boom including a rotatable drive sprocket positioned at the first end of the drill boom and a rotatable driven sprocket positioned at the second end of the drill boom;
    a carriage for supporting the drill, the carriage movable along the drill boom and having first and second idler sprockets positioned between the drive sprocket and the driven sprocket in the drill boom;
    a guide structure for guiding the movement of the carriage along the drill boom;
    a single chain having a first end independent of the carriage and fixed within the drill boom adjacent the first end of the drill boom for preventing movement thereof and a second end independent of the carriage and fixed within the drill boom adjacent the second end of the drill boom for preventing movement thereof, the chain extending sequentially from said first end of said single chain about the first idler sprocket, the drive sprocket, the driven sprocket and the second idler sprocket to said second end of said single chain such that rotation of the drive sprocket in a first direction draws the carriage towards the first end of the drill boom, and rotation of the drive sprocket in a second direction draws the carriage towards the second end of the drill boom; and a drive mechanism for rotating the drive sprocket in a predetermined direction.

10. The thrust system of claim 9 wherein the drive mechanism includes a hydraulic motor.

11. The thrust system of claim 9 wherein the guide structure includes a guide track extending along the longitudinal length of the drill boom, and a guiding member extending from the carriage and engaging the guide track.

12. The thrust system of claim 9 wherein the guide structure includes first and second guide tracks extending along the length of the drill boom.

13. The thrust system of claim 12 wherein the guide structure includes first and second guiding members extending from the carriage, each guiding member engaging a corresponding guide track.

14. The thrust system of claim 9 further comprising a chain-tension adjustment mechanism interconnected to the driven sprocket for adjusting the tension on the chain.

15. A thrust system for a horizontal directional drill, comprising:

a drill boom extending along a longitudinal axis and terminating at first and second opposite ends, the drill boom including a rotatable drive sprocket positioned at the first end of the drill boom and a rotatable driven sprocket positioned at the second end of the drill boom;

first and second guide tracks extending along the length of the drill boom;

a carriage for supporting the drill, the carriage movable along the drill boom and having first and second idler sprockets positioned between the drive sprocket and the driven sprocket in the drill boom;

first and second guiding members extending from the carriage, each guiding member engaging a corresponding guide track and guiding the movement of the carriage along the drill boom;

a single chain having a first end independent of the carriage and fixed within the drill boom adjacent the first end of the drill boom for preventing movement thereof and a second end independent of the carriage and fixed within the drill boom adjacent the second end of the drill boom for preventing movement thereof, the chain extending sequentially from said first end of said single chain about the first idler sprocket, the drive sprocket, the driven sprocket and the second idler sprocket to said second end of said single chain such that rotation of the drive sprocket in a first direction draws the carriage towards the first end of the drill boom, and rotation of the drive sprocket in a second direction draws the carriage towards the second end of the drill boom; and a drive mechanism for rotating the drive sprocket in a predetermined direction.

16. The thrust system of claim 15 further comprising a chain-tension adjustment mechanism interconnected to the driven sprocket for adjusting the tension on the chain.

* * * * *